United States Patent [19]
Campbell et al.

[11] 3,715,162
[45] Feb. 6, 1973

[54] FREE EXCITON INDIRECT TRANSITION LASER

[75] Inventors: Donald A. Campbell; James R. Packard, both of St. Paul; William C. Tait, Oak Park, all of Minn.; Richard L. Weiher, Hudson Township, St. Croix County, Minn.

[73] Assignee: Minnesota Mining and Manufacturing Company, St. Paul, Minn.

[22] Filed: April 19, 1971

[21] Appl. No.: 135,369

Related U.S. Application Data

[63] Continuation of Ser. No. 803,805, March 3, 1969, abandoned, which is a continuation-in-part of Ser. No. 715,799, March 25, 1965, abandoned.

[52] U.S. Cl..............................356/30, 331/94.5 H
[51] Int. Cl..............................................G03b 27/52
[58] Field of Search ....................331/94.5; 356/30

[56] References Cited

UNITED STATES PATENTS

3,393,373   7/1968   Stimler..............................331/94.5

OTHER PUBLICATIONS

Hurwitz, "Electron–Beam Pumped Lasers of CdSe and CdS", Applied Physics Letters, Vol. 8, No. 5, March 1, 1966, pp. 121–124

Nicoll, "Ultraviolet ZnO Laser Pumped By An Electron Beam," Applied Physics Letters, Vol. 9, No. 1, July 1, 1966 pp. 13–15

Basov "Semiconductor Lasers with Radiating Mirrors", IEEE Journal of Quantum Electronics, Vol. QE–2, No. 9, September 1966, 594–597

Kulewsky et al., "The Nature of the Laser Transition in CdS Crystal at 90°K With Two Photon Excitation", IEEE Jour. of Q.E., V. QE–2, No. 9, September 1966 pp. 584–586

Tait et al., "End Pumped Laser Emission from Cadminium Sulfide Selenide Bombarded by an Electron Beam," Jour. Appl. Phy. V. 38, June 1967, pp. 3035–3036

Brodin et al., "Mechanism of Generation of Laser Radiation in CdS CdSe Crystals in the Case of Two–Photon Excitation," Soviet Physics Semiconductors, V. 1, No. 4, Oct. 1967, pp. 495–497

Primary Examiner—Ronald L. Wibert
Attorney—Kinney, Alexander, Sell, Steldt & Delahunt

[57] ABSTRACT

A method and apparatus for selecting a direct band gap semiconductor crystal for use as a room temperature operable laser material. The crystal is selected when its emission spectrum is characterized by a series of peaks separated in energy by the energy of one longitudinal optical phonon and when the zero intensity extrapolation point on the low energy side of the highest energy peak of the series is below the lowest energy exciton peak of its reflection spectrum by an amount equal to the energy of one longitudinal optical phonon. The emission and reflection spectra are produced at 77°K.

5 Claims, 14 Drawing Figures

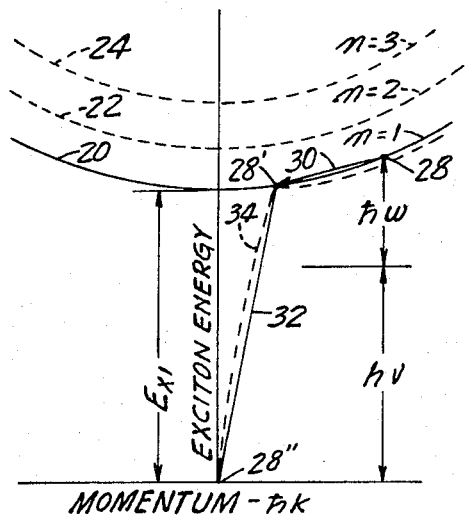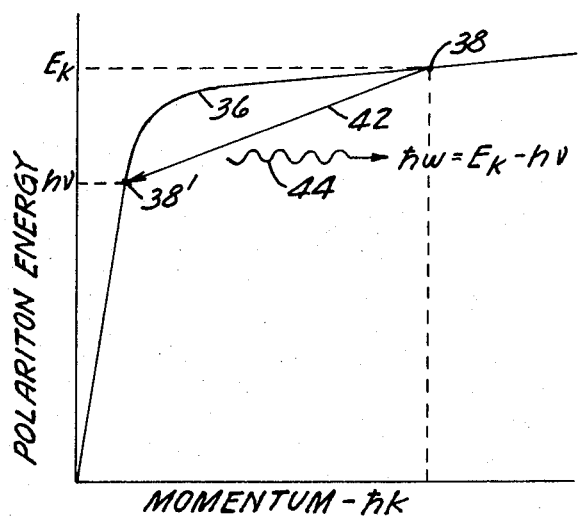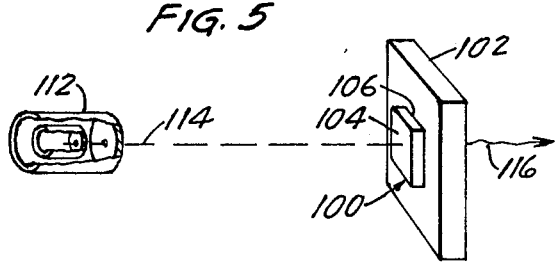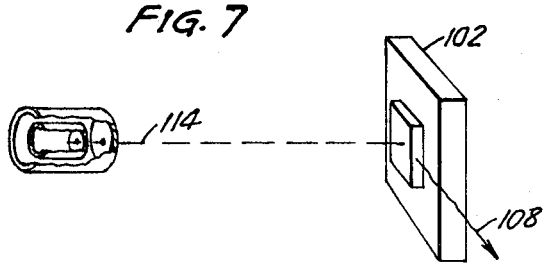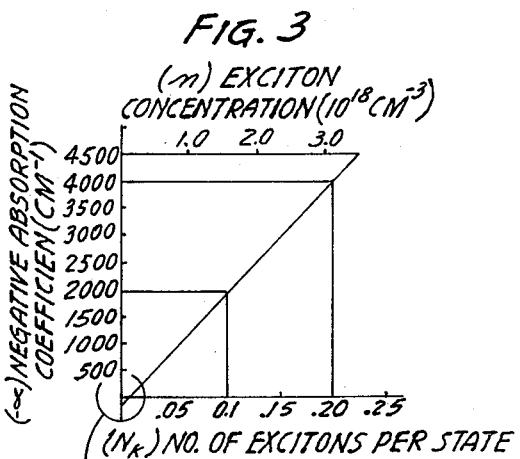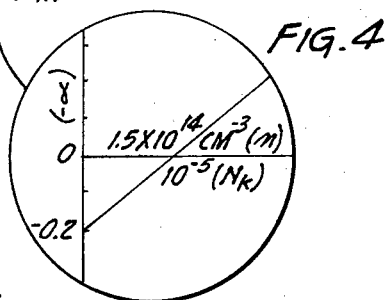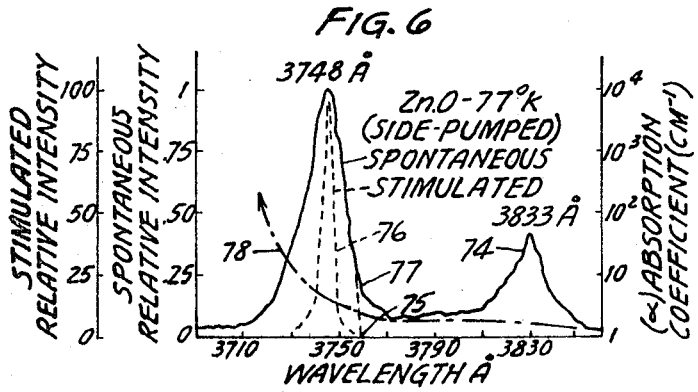

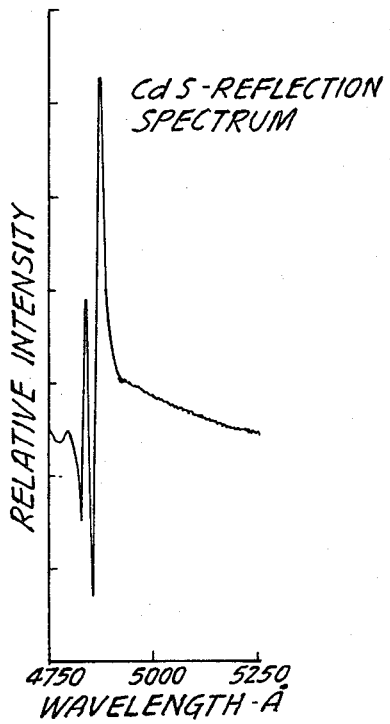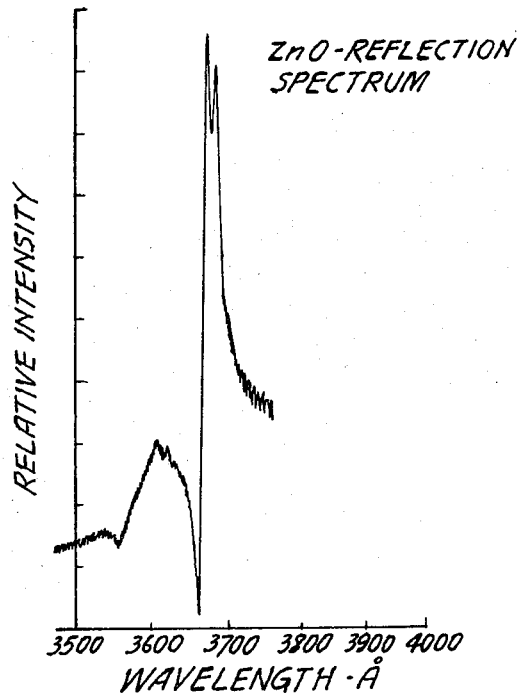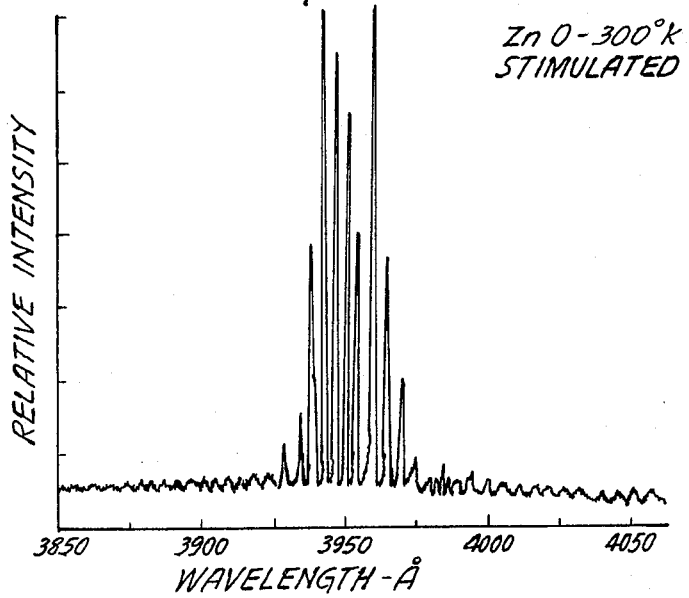

INVENTORS
DONALD A. CAMPBELL
JAMES R. PACKARD
WILLIAM C. TAIT
RICHARD L. WEIHER
BY Kinney, Alexander,
Sell, Steldt & DeLaHunt
ATTORNEYS

3,715,162

FREE EXCITON INDIRECT TRANSITION LASER

Cross References

This application is a continuation application of our copending application, Free Exciton Indirect Transition Laser, U.S. Ser. No. 803,805, filed Mar. 3, 1969 which was then a copending continuation-in-part application of U.S. Ser. No. 715,799 filed Mar. 25, 1965. Both cross-referenced applications are now abandoned.

BACKGROUND OF THE INVENTION

This invention relates in general to solid state lasers and in particular to a method for selecting solid state laser materials in which the active material which forms the resonant cavity is a single crystal of a semiconductor material.

Much effort has been expended attempting to develop such devices as evidenced by the publications cited below:

End Pumped Laser Emission From Cadmium Sulfide Selenide Bombarded by an Electron Beam, by W. C. Tait, J. R. Packard, G. H. Dierssen and D. A. Campbell, Journal of Applied Physics, Vol. 38, No. 7, 3035-3036 June, 1967.

Efficient Ultraviolet Laser Emission in Electron-Beam-Excited ZnS, by C.E. Hurwitz, Applied Physics Letters, Vol. 9, November 3, 116-118 Aug. 1, 1966.

Ultraviolet ZnO Laser Pumped by an Electron Beam, by F. H. Nicoll, Applied Physics Letters, Vol. 9, November 1, 13-15, July 1, 1966.

In each of the foregoing reported cases, the crystal was cooled to approximately liquid helium or liquid nitrogen temperatures, 4°K and 77°K, respectively. The bulk and cost of the cooling apparatus, and general inconvenience attendant with cooling a crystal to such low temperatures greatly limits the applications for which such laser would be commercially acceptable.

It has been reported that a naturally grown platelet of CdS has been made to lase on a substrate maintained at 300°K, "Room Temperature Lasing of CdS Under Pulsed Electron Bombardment", *Applied Physics Letters*, Vol. 10, Number 3, Feb. 1, 1967. The article discloses that the laser cavity was formed by cleaving the platelet, thus the cavity reflective faces were substantially normal to the as-grown major platelet surfaces. In such crystals the laser emission exits as a beam from one or both of the cleaved faces in response to an electron beam incident upon one of the as-grown platelet surfaces, i.e., the emission is normal to the excitation energy beam. Accordingly, the surface from which the emission exits is essentially a slit and only one degree of freedom fro movement (scanning) of the emission beam exists, namely, movement along the slit. In many commercial applications, e.g., electron beam recording, two degrees of freedom of movement are required.

SUMMARY OF THE INVENTION

In accordance with the present invention a direct band-gap semiconductor crystal is selected for use as a room temperature operable laser material according to the following steps:

a. producing a reflection spectrum of a said crystal at a predetermined cryogenic temperature;
b. producing a spontaneous emission spectrum of said crystal at said cryogenic temperature;
c. comparing the emission spectrum and reflection spectrum of said initially selected crystal; and
d. selecting said crystal for said use when said emission spectrum is characterized by a series of peaks separated in energy by the energy of one longitudinal optical phonon and when the zero intensity extrapolation point on the low energy side of the highest energy peak of said series is below the lowest energy exciton peak of said reflection spectrum by an amount equal to the energy of one longitudinal optical phonon.

It has been found that direct band-gap semiconductor 5 crystals will lase at room temperature provided they exhibit emission by stimulated emission from indirect transitions of free excitons. In such crystals, their side pumped emission spectrum at 77°K in their spontaneous region of operation is characterized by a series of peaks wherein the energy separation of the peaks is one longitudinal optical (LO) phonon and wherein the zero intensity extrapolation point on the low energy side of the emission spectrum's highest energy peak is one LO phonon below the crystal's lowest energy exciton reflection peak. (By highest energy peak, it is meant the highest 15 energy peak in the series because some spectra shown a higher peak(s) not in the series.)

By spontaneous emission region it is meant that region of crystal operation in which the exciting energies produce substantially only spontaneous emission in the crystal. It has been found that a 50 key continuous electron bombardment at current densities less than $10^{-4}$ amps per square centimeter produce well defined spontaneous emission spectra.

By direct band-gap semiconductors, it is meant those materials in which the minimum energy in the conduction band lies at substantially the same position in the Brillouin zone as the maximum energy in the valence band. In general, such materials may be found in the class of compounds consisting of an element of Group $2b$ of the periodic table with an element of Group $6a$ of the periodic table where the groups are those set forth in the Handbook of Chemistry and Physics, Weast 47th Edition published by the Chemical Rubber Company. And single crystalline compounds consisting of selenides, telurides, oxides and sulfides of cadmium and zinc, have been found to be particularly suitable direct band-gap semiconductor lasers. Preferably the exciton binding energy of the material should be greater than $0.1\ kT$ where $k$ is Boltzman's constant and T is temperature in degrees Kelvin.

The crystal may be naturally grown platelet or a suitably prepared wafer sliced from a bulk crystal and the crystal reflective faces may be coated with a thin metallic coating of a light reflective material such as silver. Two of the crystal surfaces should form a light resonant cavity, e.g., a Fabry-Perot cavity.

In general, parallel-plano wafers are prepared from bulk crystals by cutting the crystal (preferably, the cuts are made parallel to the C axis). The resulting wafer has a plurality of natural faces and two major cut surfaces. A layer of material adjacent the major surfaces is damaged during cutting, i.e., the destruction layer. If the wafer is intended for an application requiring scanning with two degrees of freedom, i.e., the "end pumped" mode of operation, both major surfaces are polished to remove the destruction layer and coated with a reflective material as previously indicated. If, however, it is desired to produce emission emanating from the crystal at right angles to the exciting energy, the crystal is cleaved twice to produce two parallel cleaved surfaces substantially normal to the major surfaces. For right angle emission, i.e., the "side pumped" mode of operation, it is necessary only to polish the one major surface upon which the exciting energy will be incident. Various abrasives such as 0.05 micron aluminum oxide powder and acids such as 10 percent phosphoric acid in water have been found effective in removing the destruction layer.

The electromagnetic radiation produced within a crystal in response to energy incident thereupon conveniently divides crystal operation into three regions; namely, a region wherein the radiation is attributable to spontaneous emission, the crystal spontaneous emission region, a region wherein the radiation is attributable to both spontaneous and stimulated emission, the crystal super-radiant region, and a region wherein the radiation is produced almost solely by stimulated emission, the mode oscillation region. Hereafter, the incident intensity energy marking the boundary between the spontaneous and super-radiant region shall be referred to as the "pre-determined" intensity and the energy at the boundary between the super-radiant region and the mode oscillation regions shall be referred to as the "threshold" intensity. The predetermined intensity, P, is the intensity at which the material absorption coefficient becomes zero. It has been found that as the reflectivity of the crystal faces is increased, the threshold intensity approaches the predetermined intensity. Any of various energy sources may be used to excite or pump the crystal such as an electron beam gun, a Xenon lamp or another laser.

A method for selecting a crystal suitable for operation at temperatures of approximately 300°K, i.e., a room temperature operable crystal, involves examination of the crystal reflection and emission spectrums. The emission spectrum is taken near 77°K. in the side pumped mode i.e., with the emission at right angles to the excitation energy beam, and in the crystal's spontaneous emission region. For uniaxial crystals two reflection spectrums are taken in the usual way at 77°K. One is taken using light with its electric field vector polarized perpendicular to the crystal C axis, the other is taken using light with its electric field vector polarized parallel to the crystal C axis. For cubic crystals, only one spectrum using unpolarized light would be required.

DESCRIPTION OF THE DRAWING

FIG. 1 is a graph representing energy bands within a direct band gap semiconductor material and transitions by free excitons during annihilation to produce photons and longitudinal optical phonons;

FIG. 2 is a graph representing polariton energy plotted as a function of momentum and scattering of a polariton between different energy states to produce electromagnetic radiation;

FIG. 3 shows graphs illustrating both the theoretical negative absorption coefficient as a function of both the exciton concentration cm$^{-3}$ and the number of excitons per state for ZnO at 77°K;

FIG. 4 is an exploded view in the vicinity of the origin of the graph of FIG. 3 illustrating the number of excitons per state and the exciton concentration required for obtaining negative absorption from the ZnO semiconductor material;

FIG. 5 is a pictorial representation of a single crystal of a direct band gap semiconductor material end-pumped by an electron beam to generate electromagnetic radiation by stimulated emission in a direct parallel to the electron beam;

FIG. 6 is a graph illustrating the emission spectra for the spontaneous and stimulated emission of a ZnO semiconductor material operated at 77°K in the side pumped configuration;

FIG. 7 is a pictorial representation of a single crystal of a direct band gap semiconductor material which is responsive to being side-pumped by an electron beam to generate electromagnetic radiation by stimulated emission in a direction perpendicular to the electron beam;

FIG. 8 represents the ZnO free exciton reflection spectrum at 77°K with the electric field vector of the light polarized normal to C;

FIG. 10 represents the ZnO end-pumped stimulated emission spectrum for ZnO at 300°K;

FIG. 12 is the free exciton reflection spectrum of CdS at 77°K with the electric field vector polarized normal to C;

DESCRIPTION OF THE PREFERRED EMBODIMENTS

Figure 9:
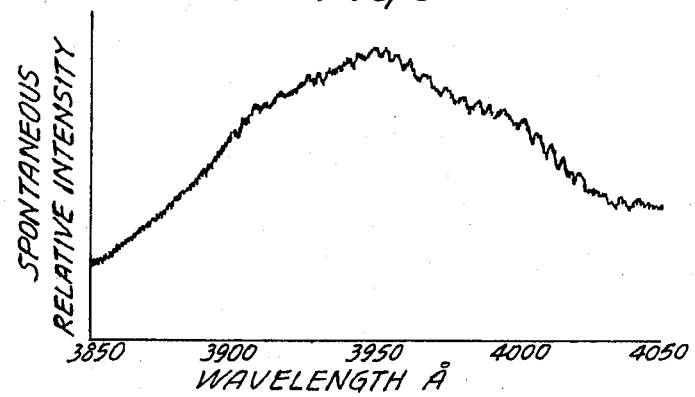
FIG. 9 represents the end-pumped spontaneous region emission spectrum for ZnO at 300°K.

The mechanism believed to produce laser emission at room temperatures from DBG semiconductors is indirect transition of free excitons. It is hypothesized that a free exciton results when an electron in the conduction band and a hole in the valence band are coupled by their mutual electrostatic forces and remain in close proximity to each other. Such a high-energy or excited entity referred to as a free exciton is free to move at random throughout the lattice until "annihilated." When annihilated, the exciton may be lost in the crystal such as by becoming bound to a defect or by absorbing thermal energy and becoming an uncoupled electron and hole. Or the exciton may be annihilated by giving off radiative energy referred to as a radiative transition. The energy given off may be either absorbed within the material or emitted from the material as electromagnetic radiation. More particularly, in a radiative transition the energy is given off as either a photon or a photon and one or more phonons. An annihilation of an exciton in which only a photon is generated is generally known as a direct radiative transition, and one in which a photon and at least one phonon is given off is generally known as an indirect radiative transition.

The conditions for promoting stimulated emission from free exciton indirect radiative transitions in preference to the other manners of free exciton annihilation will become more apparent following a discussion of the free exciton mechanism.

FIG. 1 represents an energy band diagram of the exciton bands of a direct band gap semiconductor material. In FIG. 1, the ordinate represents the exciton energy E and the abscissa represents the momentum $\hbar K$. There are $n$ exciton energy bands within a direct band gap semiconductor material which would be represented by an $n$ number of parabolic lines, only three of which are shown and identified as lines 20, 22 and 24.

For purposes of example, assume that an exciton has an energy level in the energy band $n=1$ which is designated by 20. An exciton having a momentum of $\hbar K$ and an initial energy $E_K$ on energy band 20 is represented by point 28. The energy $E_K$ of point 28 can be represented by the following equation (1):

$$(1) \; E_K = \hbar\omega + h\nu$$

wherein:

*$\hbar\omega$ is equal to the energy of a longitudinal optical phonon; and*

*$h\nu$ represents the energy of a photon.*

When the exciton represented by point 28 is annihilated, the exciton loses its energy $E_K$ in a two-step process. The first step is that the exciton passes from its initial state, represented by point 28 to an intermediate state represented by point 28', the path of which is designated by arrow 30. The intermediate energy state designated by point 28' is a virtual state and can be located on other energy bands, including higher energy band 22 or 24. The second step is that the exciton passes from its intermediate state, represented by point 28', to its final energy state at the origin of the diagram, represented by point 28'', the path of which is designated by arrow 32. The final energy state represents the energy level of a recombined electron-hole pair. When an exciton is annihilated by passing from its initial state through its intermediate energy state to its final energy state, a longitudinal optical phonon having an energy $\hbar\omega$ and a photon having an energy $h\nu$ are created.

From the exciton model depicted by the diagram of FIG. 1, it is possible to derive the general equation for the absorption coefficient of the direct band gap semiconductor material utilized in the present invention. In so doing, the energy between the minimum energy point of energy band 20 relative to the origin, point 28'', is designated $E_{x1}$. In order to derive the absorption coefficient, $\alpha(\nu)$, it is necessary to calculate both the rate at which excitons are annihilated, i.e., the rate at which they decrease in energy from point 28 to 28'', and the rate at which the excitons are created by simultaneous annihilation of longitudinal optical phonons and photons, i.e., creating an exciton having an energy at point 28 on curve 20. The difference between the rate of creation and the rate of annihilation of the excitons divided by the product of the number of photons per state times the speed of light in the material at the frequency of the electromagnetic radiation results in the absorption coefficient of the material.

FIG. 1 is a description of excitons using a known energy band model. However, an exciton-photon coupling energy actually exists and the energy of an exciton at any state can be defined by a polariton curve or model which is depicted by dashed curve 34.

In order to calculate the absorption coefficient $\alpha(\nu)$, reference is made herein to FIG. 2. In FIG. 2, a curve 36, corresponding to dashed curve 34 of FIG. 1, is obtained by plotting polariton energy, E, along the ordinate as a function of momentum, $\hbar K$, plotted along the abscissa. A polariton is a particle which at any time represents a quantum of energy associated with the coupled exciton-photon fields wherein the polariton at a particular time will appear, substantially, as either an exciton at energy levels above the knee of FIG. 2 or as a photon below the knee. The path designated by arrow 42 in FIG. 2 is analogous to the path represented by arrows 30 and 32 of FIG. 1 designating the path traversed by the exciton as it passes from its initial energy state of point 28 to its final energy state of point 28''.

In FIG. 2 the polariton when at its high energy state is represented by point 38. In this state, the polariton is substantially an exciton. The energy of the polariton as represented by point 38 is located anywhere along the upper portion of curve 36. When the polariton represented by point 38 is scattered, it immediately and in a one-step process scatters along a path represented by arrow 42 to a lower energy level $h\nu$ designated by point 38' on curve 36 which represents the final energy state of the polariton. The initial energy level of the polariton represented by point 38 in FIG. 2 is analogous to the initial energy level of the exciton represented by point 28 of FIG. 1. When the polariton scatters from point 38 to point 38' in FIG. 2, a longitudinal optical phonon is generated and is represented by waveform 44. The energy of the longitudinal optical phonon represented by waveform 44 has an energy $\hbar\omega$ which is equal to $E_K - h\nu$. The polariton when at point 38' then exhibits a characteristic which is substantially that of a photon having an energy $h\nu$. The photon is either absorbed within or emitted from the crystal as electromagnetic radiation.

The rate of scattering of polaritons from point 38 to point 38' by stimulated emission is given by (2)

$$(2) \; w_s = A(\nu) N_K (N_p + 1) N_\nu$$

wherein:

$N_p$ is the number of longitudinal optical phonons per state;

$N_K$ is the number of polaritons per state with substantially the same momentum as the longitudinal optical phonons at point 38 in FIG. 2;

$N_\nu$ is the number of polaritons in the final state at point 38' in FIG. 2; and $A(\nu)$ is defined by the following equation (3):

$$(3) \; A(\nu) = 2\omega e^2 \sqrt{\epsilon'} M\pi\beta\nu(1/\epsilon_\infty - 1/\epsilon_o)/(\hbar E_{x1} K)$$
$$\times (1+h\nu/E_{x1})^2 ([1-(h\nu/E_{x1})_2]^2 + 4\pi\beta/\epsilon')^{-1}$$
$$\times ([1+(m_e Ka/2M)^2]^{-2} - [1+m_h Ka/2M)^2 b]^{-2})^2$$

wherein:

$\omega$ is the angular frequency of the phonon;

$\epsilon'$ is the dielectric constant of the semiconductor material at frequency $\nu$.

$M$ is the mass of the exciton;

$\beta$ is the polarizability of the exciton;

$\nu$ is the frequency of the polariton in state 38';

$\epsilon_\infty$ is the high frequency dielectric constant of the semiconductor material;

$\epsilon_o$ is the static dielectric constant of the semiconductor material;

$\hbar$ is Planck's constant minimum by $2\pi$.

$e_{x1}$ is the minimum energy of the lowest energy band (illustrated in FIG. 1);

$K$ is the wavenumber of the polariton in state 38;

$m_e$ is the mass of the electron;

$m_h$ is the mass of the hole; and $a$ is the Bohr radius of the exciton.

The rate of scattering of the polaritons from point 38' to point 38 can be designated as $w_a$ and is defined by the following equation (4):

$$(4)\ w_a = A(v) N_p (N_K + 1) N_v$$

wherein the variables are defined as in equation (3). The absorption coefficient $\alpha(v)$ of the semiconductor material can be defined by the following equation (5):

$$(5)\ \alpha(v) = w_a - w_s / c N_v$$

wherein $c$ is equal to the velocity of light. Equation 5 reduces to the following equation (6):

$$(6)\ \alpha(v) = A(v) / c\ [N_p - N_K].$$

Equation (6) defines physically the absorption coefficient of the direct band gap semiconductor material for practicing this invention.

Previously, the predetermined intensity P, was defined as the intensity at which the material absorption coefficient becomes equal to zero. Therefore at predetermined intensity from (6):

$$(7)\ N_p = N_k.$$

The number of excitons per state, $N_K$, is related to the exciton concentration in the crystal, $n$, by (8)

$$(8)\ N_K = C(T) n$$

wherein $$C(T) = 8/e(\pi \hbar^2 / 2MkT)^{3/2} = 2.95\ (\pi \hbar^2 / 2MkT)^{3/2}$$

and wherein $k$ = Boltzman's constant.

The exciton generation rate, G, is related to $n$ by (9):

$$(9)\ G = n/\tau$$

$\tau$ is the lifetime of an exciton. Assuming the free exciton losses from causes other than free exciton indirect radiative transitions is negligible, $\tau$ can be defined by (10):

$$(10)\ \tau = \hbar M K c^3 / A(v) (hv)^2$$

and the predetermined intensity, P, is related to the generation rate by (11):

$$(11)\ P = G l E_{xl} / \eta$$

wherein:

$l$ is the diffusion length of an exciton before it is annihilated, and $\eta$ is the internal power conversion efficiency given by (12):

$$(12)\ \eta = 2 P_{out} / P_{in} (1 - \cos\theta_c)$$

wherein:

$\theta_c$ is the material's critical angle; and $P_{out}$ is the total measured light power in the free exciton series taken from the crystal face upon which an exciting beam of power $P_{in}$ is incident.

Previously it was stated that as the reflectivity of the crystal face was increased, the threshold intensity, T.I., approaches the predetermined intensity. This can be seen from equation (13) wherein it has been assumed that $l$ is the cavity length for the special case in which the cavity length is equal to the exciton diffusion length.

$$(13)\quad TI = P\left\{1 + \frac{c}{N_P A(v) l} \ln \frac{1}{\sqrt{R_1 R_2}}\right\}$$

wherein:

$R_1$ and $R_2$ are the crystal surface reflection coefficients. As the reflection coefficients approach 1, equation (13) gives $TI = P$.

Having shown how to arrive at the predetermined intensity for any direct band gap material in general we will now consider the case for ZnO specifically, in which the following parameters were used:

| | | |
|---|---|---|
| $T = 77°K$; | $a = 1.4 \times 10^{-8}$ cm | $N_P = 10^{-5}$ |
| $m_e = 2.7 \times 10^{-28}$ g | $c = 1.2 \times 10^{10}$ cm/sec. | $\hbar\omega = 0.072$ ev |
| $m_h = 18 \times 10^{-28}$ g | $l = 10^{-4}$ cm | $K = 6 \times 10^6$ cm$^{-1}$ |
| $M = 20.7 \times 10^{-28}$ g | $\eta = 0.1$ | $A(v) = 2.4 \times 10^{14}$ sec.$^{-1}$ |
| $E_{xl} = 3.37$ ev | $hv = 3.306$ ev | $\tau = 3.5 \times 10^{-9}$ sec. |

FIG. 3 is a graph showing the negative absorption coefficient versus the number of excitons per state for ZnO at a temperature of about 77°K as calculated by equation (6). The negative absorption coefficient $-\alpha$, is plotted along the ordinate. Exciton concentration, n, and excitons per state, $N_K$, are plotted along the upper and lower abscissas respectively. FIG. 3 clearly depicts that as the number of excitons per state is increased, the negative absorption coefficient of the crystal increases at a very rapid rate. The exciton concentration for high negative absorption coefficients is relatively low as depicted in FIG. 3.

FIG. 4 is an exploded view of the origin of the graph of FIG. 3 and depicts that a relatively low number of excitons per state is required to achieve an overall negative absorption. Specifically, it shows that in ZnO $1.5 \times 10^{14}$ excitons per cubic centimeter will exist when the absorption coefficient becomes zero, i.e., at predetermined excitation energies. From the foregoing data, the predetermined intensity P is calculated to be 20 watts per square centimeter. In one experiment, wherein $R_1$ and $R_2$ were 0.9 each, the threshold intensity was measured to be approximately $10^5$ watts per square centimeter using a 50 kev electron beam which corresponds to a current density J of 2 amp per square centimeter. The threshold intensity as calculated by equation (12) agrees with this value.

Having thus described the distinguishing characteristics of selecting DBG semiconductor crystals for use as room temperature laser materials, an exemplary embodiment will now be described.

FIG. (5) shows a DBG semiconductor single crystal 100 mounted to a support 102 of a material such as sapphire. An energy source 112, such as an electron beam gun, produces a beam of energy which is incident upon a major surface 104 of the crystal to produce stimulated emission within the crystal whereupon electromagnetic radiation emits from the other crystal major surface 106 and passes through the sapphire support as a wave of electromagnetic radiation 116.

EXAMPLE 1

In one example crystal 100 was a ZnO platelet having dimensions in the order of 1 mm $\times$ 2 mm $\times$ 35$\mu$ with the 35μ dimension being the cavity length. The platelet was mounted on sapphire support 102 with one of the 1 mm × 2 mm faces thereof in contact with the support. The platelet face 104 was silvered to about 90 percent reflectivity and face 106 was silvered to about 85 percent reflectivity. Upon bombardment of face 104 by electron beam 114, electromagnetic radiation emerged from face 106.

FIG. 6 is a representation of a typical side pumped ZnO spontaneous emission region spectrum showing the two highest energy peaks in the one LO phonon energy separated series. As shown the zero intensity extrapolation point on the low energy side of the highest energy peak of the series, shown as 75 in the figure, occurred at approximately 3,760 A which corresponds to an energy of about 3.3 electron volts. FIG. 7 shows the side pumped configuration used to obtain the spectrum. Support 102 was attached to the cold finger of a cryostat (not shown) filled with liquid nitrogen and the electromagnetic radiation 108 emerged from a face at right angles to the electron beam 114.

FIG. 8 shows the exciton reflection spectrum for ZnO at 77°K taken with the electric field vector of the light normal to C. As shown the lowest energy exciton reflection peak occurs at 3678A, which corresponds to an energy of 3.37 electron volts. In ZnO, the energy of a LO phonon is known to be 0.073 electron volts.

When the zinc oxide platelet was operated in the mode of FIG. 5, at room temperature, i.e., about 300°K and pumped with a pulsed electron beam at 8.5 amps. per square centimeter and 45 kev with 100 nano second pulses at a repetition rate of 60 pulses per second, the spectrum was as shown in FIG. 9. The spectrum peaked at about 3,950 A.

When the electron beam intensity was increased, above threshold, to about 9.5 amps/cm², stimulated emission was produced from the crystal as evidenced by the emission spectrum shown in FIG. 10. As shown, the spectrum exhibited pronounced modes centered about 3,950 A.

EXAMPLE 2

In another example, crystal 100, CdS having dimensions in the order of 2 mm × 3 mm × 11μ, was utilized to produce curves of FIGS. 11-14 with the cavity length being equal to 11μ. The CdS platelet was mounted on the sapphire support 102 with one of the 2 mm × 3 mm faces thereof in contact with the support. The CdS crystal platelet had its face 104 silvered to about 550 A and its face 106 silvered to about 340 A. When the face 104 was bombarded by the electron beam 114, electromagnetic radiation 116 emerged from face 106. The CdS crystal platelet used herein was parallel to at least an angle of about 17 seconds of arc.

Figure 11:
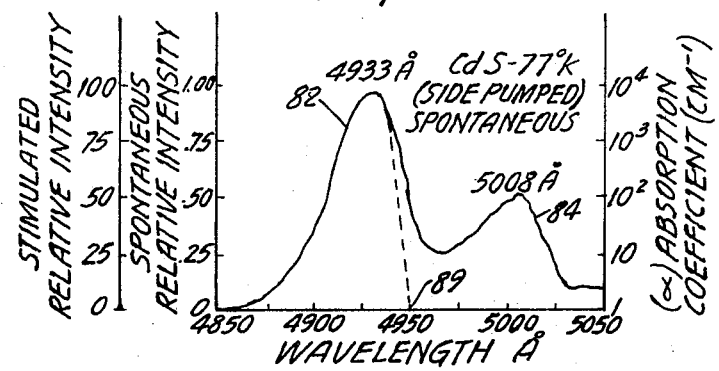
FIG. 11 is a graph illustrating the emission spectra for the spontaneous and stimulated emission of a CdS semiconductor material operated at 77°K in the side pumped configuration.

The platelet emission spectrum was taken at 77°K. and appeared as shown by the graph of FIG. 11. To obtain the spectrum, support 102 was attached to the cold finger of a cryostat filled with liquid nitrogen and the electromagnetic radiation 116 (emerging through a window in the cryostat) was swept with a monochrometer grating. As shown in FIG. 11 the emission spectrum exhibited a series of peaks separated in energy by one LO phonon. The zero intensity extrapolation point on the low energy side of the highest energy peak, shown as 89 in FIG. 11, occurred at 4,950A.

FIG. 12 shows the exciton reflection spectrum for CdS at 77°K taken with the electric field vector of the light normal to C. As shown the lowest energy peak occurred at 4,872A, corresponding to an energy of 0.038 ev above the zero intensity extrapolation point of highest energy peak of the series of peaks separated by an energy of one longitudinal optical phonon.

Figure 13:
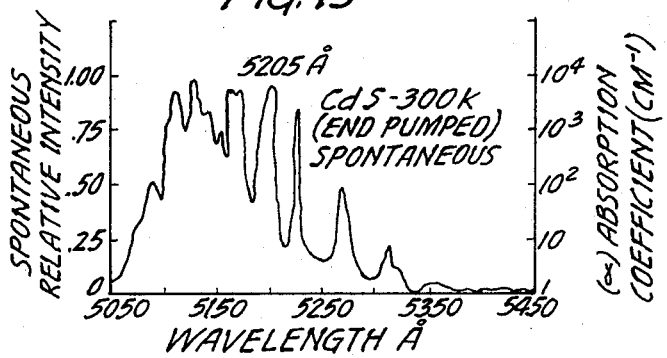
FIG. 13 is a graph of the spontaneous emission from end-pumped CdS at room temperature.

When the temperature of the CdS crystal platelet was increased to room temperature, say in the order 300°K, the spontaneous emission region electromagnetic radiation spectrum, plotted as a function of wavelength, was as is illustrated in the graph of FIG. 13. The emission spectrum shows pronounced modes. The mode of maximum intensity for stimulated emission is shifted to a longer wavelength compared to the corresponding spontaneous emission peak at 77°K. Specifically, the major peak shifted (relative to FIG. 11); namely, from 4,932A.

Figure 14:
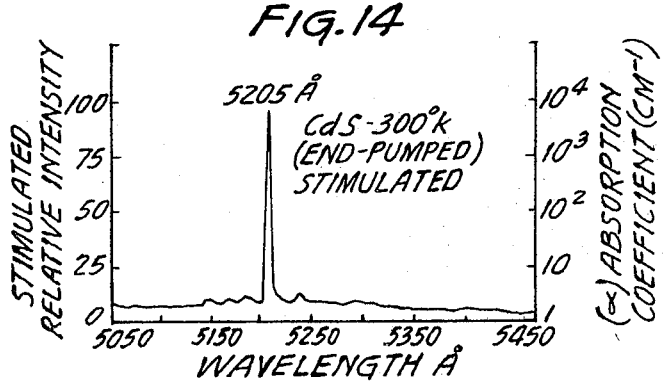
FIG. 14 is a graph illustrating the stimulated emission from the same end pumped CdS semiconductor material as used in FIG. 13 again at room temperature.

When the electron beam current density was increased above threshold, to 10 amps per square centimeters, stimulated emission was produced from the crystal as evidenced by the emission spectrum shown in FIG. 14. The major peak occurred at substantially the same wavelength as that for the conditions of FIGS. 13; namely at 5,205A.

The emission generated by the CdS end-pumped crystal platelet may involve more than one longitudinal optical phonon and therefore a free exciton laser using multiple phonon processes would be considered to be within the scope of this invention. It is understood that the generation of electromagnetic radiation from a direct band gap semiconductor material, such as for example the CdS crystal platelet, in other geometries or modes exhibits the same general transitions.

The teachings disclosed herein have wide application. For example, the free exciton indirect transition laser can be used for transmitting information between a transmitter and a receiver or can be used for recording graphic images onto a strip member. Other modifications, uses, improvements and the like can be made of the embodiments disclosed herein and all are deemed to be within the scope of the teachings of the present invention. Although only exemplary direct band gap semiconductor materials capable of use in a free exciton indirect transition laser are shown herein, it is possible that certain other materials and compounds including I-VII, II-VI and Iv-VII compounds can be selected and identified according to the teachings herein. All such used, modifications, improvements and the like are intended to be within the scope of the appended claims.

We claim:

1. A method of selecting a direct band gap semiconductor crystal for use as a room temperature operable laser material characterized by an emission spectrum which includes a series of emission line peaks which are separated by an energy difference which corresponds to one longitudinal optical phonon comprising:

a. producing a reflection spectrum of a said crystal at a predetermined cryogenic temperature to obtain the exciton peaks characteristic of said crystal;

b. producing a spontaneous emission spectrum of said crystal at said predetermined cryogenic temperature, c. extrapolating a straight line function from the low energy side of the highest produced energy peak of said series of emission line peaks to obtain a zero intensity point for said highest peak,
d. comparing said reflection spectrum and said spontaneous emission spectrum, including said extrapolated zero intensity point, and
e. selecting for use as room temperature operable laser material those semiconductor crystals whose extrapolated zero intensity point is below the lowest energy exciton peak of said reflection spectrum by an amount equal to the energy of one longitudinal optical phonon.

2. A method according to claim 1 wherein said predetermined cryogenic temperature is about 77° K.

3. A method according to claim 1 wherein the steps of producing said emission spectrum comprises measuring the spontaneous emission spectrum of said crystal by exciting a face of said crystal with electrons having a predetermined energy to excite said crystal into at least a region of spontaneous emission, and by selecting for measurement such emission as has not been subjected to appreciable absorption within said crystal.

4. A method according to claim 3 wherein the step of producing said emission spectrum further comprises measuring emission emitted in a direction parallel to said face.

5. A method for selecting a single crystal of a direct band gap semiconductor for use as a laser operable at room temperature according to claim 4 wherein said direct band gap single crystal is selected from the group consisting of zinc oxide and cadmium sulfide and has at least a pair of spaced parallel reflective faces, wherein the step of producing an emission spectrum comprises exciting a face of said crystal with a beam of electrons having an energy less than 50 Kev and a current density of less than $10^{-4}$ amps/cm².

* * * * *